US012437948B2

(12) United States Patent
Kuo

(10) Patent No.: US 12,437,948 B2
(45) Date of Patent: Oct. 7, 2025

(54) ELECTROMAGNETIC RELAY

(71) Applicant: EXCEL CELL ELECTRONIC CO., LTD., Taichung (TW)

(72) Inventor: Ming-Chang Kuo, Taichung (TW)

(73) Assignee: Excel Cell Electronic Co., Ltd., Taichung (TW)

( * ) Notice: Subject to any disclaimer, the term of this patent is extended or adjusted under 35 U.S.C. 154(b) by 268 days.

(21) Appl. No.: 18/470,804

(22) Filed: Sep. 20, 2023

(65) Prior Publication Data

US 2024/0128039 A1 Apr. 18, 2024

(30) Foreign Application Priority Data

Oct. 14, 2022 (TW) ................................ 111139059

(51) Int. Cl.
*H01H 50/54* (2006.01)
*H01H 50/64* (2006.01)

(52) U.S. Cl.
CPC .......... *H01H 50/54* (2013.01); *H01H 50/645* (2013.01)

(58) Field of Classification Search
CPC .... H01H 50/54; H01H 50/645; H01H 50/641; H01H 1/32; H01H 2050/028; H01H 50/026; H01H 50/26; H01H 1/50; H01H 1/54; H01H 50/14; H01H 50/163; H01H 50/18
See application file for complete search history.

(56) References Cited

U.S. PATENT DOCUMENTS

2017/0069452 A1* 3/2017 Hiroki .................. H01H 50/546

FOREIGN PATENT DOCUMENTS

JP 2016177896 A * 10/2016 ............. H01H 50/58
WO WO-2019225524 A1 * 11/2019 ............. H01H 50/56

* cited by examiner

*Primary Examiner* — Shawki S Ismail
*Assistant Examiner* — Lisa N Homza
(74) *Attorney, Agent, or Firm* — Burris Law, PLLC

(57) ABSTRACT

An electromagnetic relay includes an electromagnetic unit, a magnetic moving subunit, a first conduct, a second conduct, a movable lead, and a movable contact. The movable lead has a swing portion and a resilient linkage portion. The movable contact is disposed on the swing portion. When the electromagnetic unit is energized, the magnetic moving subunit is attracted by the electromagnetic unit and pushes the resilient linkage portion of the movable lead such that the resilient linkage portion urges the swing portion to swing and that the movable contact disposed on the swing portion is urged to be in contact with one of the first contact and the second contact. When the electromagnetic unit is de-energized, the electromagnetic unit ceases to attract the magnetic moving subunit such that the movable contact is in contact with the other one of the first contact and the second contact.

9 Claims, 14 Drawing Sheets

ELECTROMAGNETIC RELAY

CROSS-REFERENCE TO RELATED APPLICATION

This application claims priority to Taiwanese Invention Patent Application No. 111139059, filed on Oct. 14, 2022, and incorporated by reference herein in its entirety.

FIELD

The disclosure relates to a relay, and more particularly to an electromagnetic relay.

BACKGROUND

A conventional electromagnetic relay that includes a movable conductive terminal, a first fixed conductive terminal, and a second fixed conductive terminal is capable of urging the movable conductive terminal to move between the first fixed conductive terminal and the second fixed conductive terminal via an electromagnetic force generated by low electric currents. Thus, the conventional electromagnetic relay serves as a switch that controls two electrical systems which are respectively connected to the first and second fixed conductive terminals.

However, arcing may occur when the movable conductive terminal is urged to be in contact with any one of the first and second fixed conductive terminals, and high energy from the arcing may result in formation of corrosion on the movable conductive terminal and the first and second fixed conductive terminals. Consequently, there may be a gap between the movable conductive terminal and any one of the first and second conductive terminals. The gap may cause contact failure and reduce the service life of the conventional electromagnetic relay.

Even though the conventional electromagnetic relay may further include a vacuum chamber to prevent arcing, such conventional electromagnetic relay may lead to high operating cost and maintenance thereof may not be easy.

SUMMARY

Therefore, an object of the disclosure is to provide an electromagnetic relay that can alleviate at least one of the drawbacks of the prior art.

According to the disclosure, the electromagnetic relay includes a base unit, an electromagnetic unit, a magnetic attraction unit, a first conductive terminal, a second conductive terminal, and a movable conductive terminal. The electromagnetic unit is disposed on the base unit, and is capable of generating a magnetic field when energized. The magnetic attraction unit is disposed on the base unit, is connected to the electromagnetic unit, and includes a magnetic moving subunit. The electromagnetic unit attracts the magnetic moving subunit via the magnetic field when energized. The first conductive terminal is disposed on the base unit, and includes a first contact. The second conductive terminal is disposed on the base unit, and includes a second contact that is spaced apart from the first contact in a first direction. The first conductive terminal and the second conductive terminal cooperatively define a gap therebetween. The movable conductive terminal is disposed on the base unit, and includes a movable lead and a movable contact. The movable lead has a positioning portion that is positioned at the base unit, a swing portion that extends in a second direction from the positioning portion to the gap between the first conductive terminal and the second conductive terminal, and a resilient linkage portion. The magnetic moving subunit is operable to push the movable lead such that the movable lead is resiliently bent. The movable contact is disposed on the swing portion. The resilient linkage portion is located between the positioning portion and the movable contact, extends from the swing portion toward the electromagnetic unit in the first direction and then toward the movable contact in the second direction. The second direction and the first direction are non-parallel. When the electromagnetic unit is energized, the magnetic moving subunit is attracted by the electromagnetic unit and pushes the resilient linkage portion of the movable lead such that the resilient linkage portion urges the swing portion to swing and that the movable contact disposed on the swing portion is urged to be in contact with one of the first contact and the second contact. When the electromagnetic unit is de-energized, the electromagnetic unit ceases to attract the magnetic moving subunit such that the movable contact is in contact with the other one of the first contact and the second contact.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
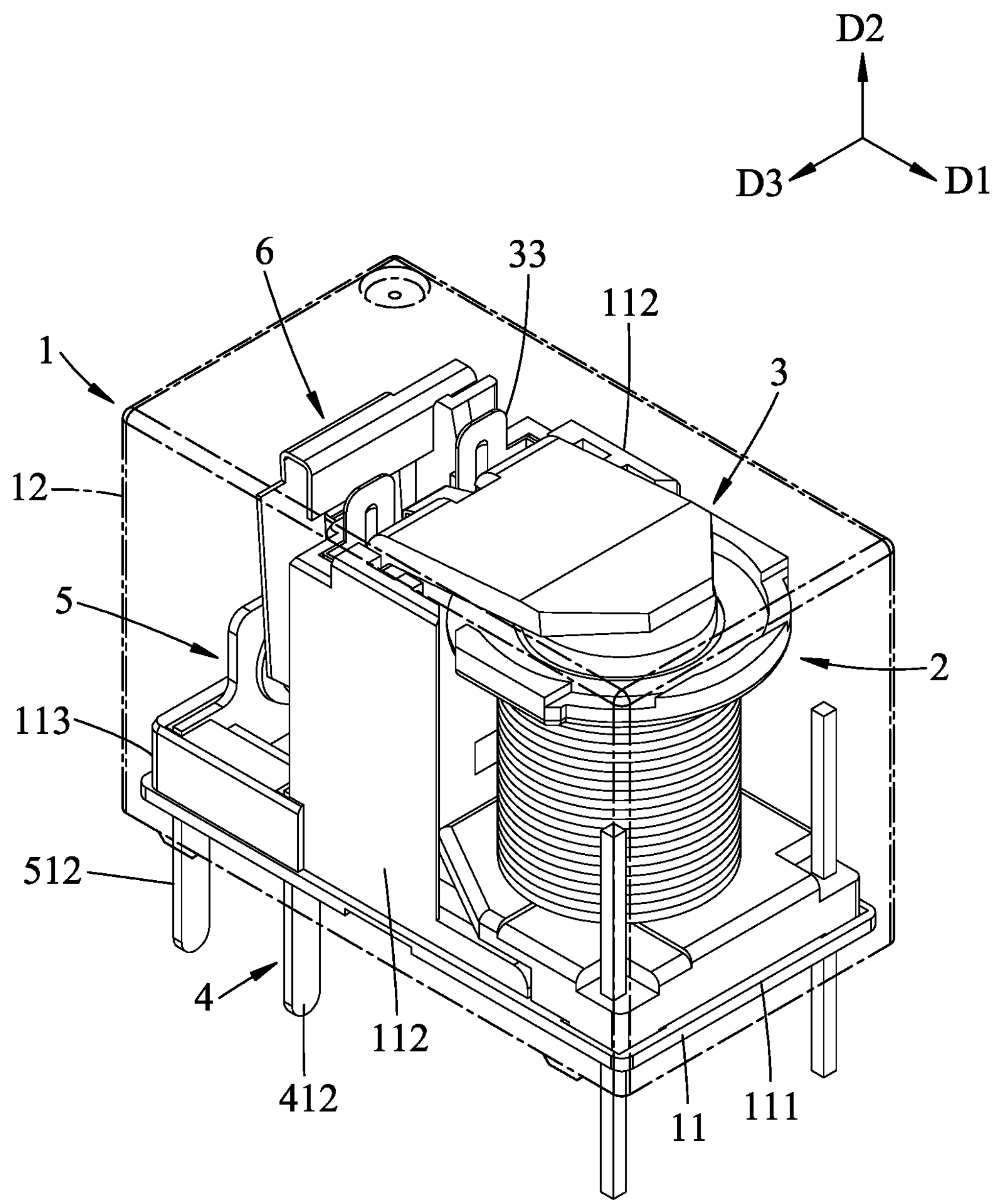
FIG. 1 is a perspective view of an embodiment of an electromagnetic relay according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of an electromagnetic relay according to the disclosure includes a base unit 1, an electromagnetic unit 2, a magnetic attraction unit 3, a first conductive terminal 4, a second conductive terminal 5, and a movable conductive terminal 6.

The base unit 1 includes a base seat 11, and a housing 12 that is disposed on and covers the base seat 11.

The base seat 11 has a base wall 111, two side walls 112, a lead seat body 113, a block seat body 114, and a positioning wall 115. The base wall 111 extends along a first direction (D1). Each of the side walls 112 is substantially L-shaped and extends upwardly from the base wall 111 in a second direction (D2) (i.e., each of the side walls 112 has a cross section that is perpendicular to the second direction (D2) and that is substantially L-shaped). The side walls 112 are spaced apart from each other in a third direction (D3). The lead seat body 113 is substantially L-shaped, and extends upwardly from the base wall 111 in the second direction (D2). A length from a top end of the lead seat body 113 to the base wall 111 is shorter than a length from a top end of any one of the side walls 112 to the base wall 111. The block seat body 114 extends upwardly from the base wall 111 in the second direction (D2). A length from a top end of the block seat body 114 to the base wall 111 is larger than the length from the top end of the lead seat body 113 to the base wall 111, and is shorter than the length from the top end of any one of the side walls 112 to the base wall 111. The block seat body 114 is adjacent to the lead seat body 113 in the first direction (D1), and is located between the side walls 112. The positioning wall 115 extends from the lead seat body 113 to one of the side walls 112 in the first direction (D1).

In this embodiment, the first direction (D1), the second direction (D2), and the third direction (D3) are substantially orthogonal to each other (i.e., the first direction (D1), the second direction (D2), and the third direction (D3) are mutually orthogonal). In this embodiment, the first, second, and third direction (D1, D2, D3) may be, but is not limited to being, respectively parallel to a left-right direction, an up-down direction, and a front-rear direction.

The housing 12 cooperates with the base seat 11 to define an accommodating space 13, and includes a partition plate 121 that extends downwardly from an inner surface thereof, and that has a bottom end located above the block seat body 114. The partition plate 121 is located between the lead seat body 113 and a group of the side walls 112 in the first direction (D1), and divides the accommodating space 13 into a first space 131 that is between the side walls 112, and a second space 132 that is above the lead seat body 113. The partition plate 121 and the block seat body 114 cooperatively define a space-communicating opening 133 therebetween in the second direction (D2). The space-communicating opening 133 is in spatial communication with the first and second spaces 131, 132.

The electromagnetic unit 2 is disposed on the base unit 1, is located in the first space 131 of the accommodating space 13 defined by the base unit 1, and is capable of generating a magnetic field when energized. The electromagnetic unit 2 is an electromagnet, and has a first end 21, and a second end 22 that is opposite to the first end 21 in the second direction (D2), and that is connected to the base wall 111.

The magnetic attraction unit 3 is disposed on the base seat 11, and is connected to the electromagnetic unit 2. The magnetic attraction unit 3 includes a magnetic member 31, a magnetic moving subunit 32, and a resilient member 33.

The magnetic member 31 is substantially L-shaped, and has a fixed portion 311 that is fixedly mounted to the second end 22 of the electromagnetic unit 2, and a body portion 312 that extends upwardly from one side of the fixed portion 311 in the second direction (D2).

The magnetic moving subunit 32 includes a magnetic attraction member 321 that is adjacent to the electromagnetic unit 2, and a pushing block 322.

The magnetic attraction member 321 has a magnetic attraction portion 3211, an engaging portion 3212 that is opposite to the magnetic attraction portion 3211 and that is adjacent to the space-communicating opening 133, and a through hole 3213 that is located between the engaging portion 3212 and the magnetic attraction portion 3211. The first end 21 of the electromagnetic unit 2 attracts the magnetic attraction portion 3211 of the magnetic attraction member 321 of the magnetic moving subunit 32 via the magnetic field when energized.

The pushing block 322 is made of an electrical insulating material. The pushing block 322 is connected to the engaging portion 3212 of the magnetic attraction member 321, extends through the space-communicating opening 133, and is movable relative to the space-communicating opening 133 in the first direction (D1). The pushing block 322 has a pushing block body 3221, an engaging hole 3222, an alignment protrusion 3223, a first protrusion 3224, and a second protrusion 3225. The pushing block body 3221 abuts against the top end of the block seat body 114, and extends from the first space 131 into the second space 132 through the space-communicating opening 133 in the first direction (D1). The engaging hole 3222 extends through the pushing block body 3221 in the second direction (D2). The engaging portion 3212 of the magnetic attraction member 321 engages the engaging hole 3222. The alignment protrusion 3223 protrudes from one end of the pushing block body 3221 that is located in the second space 132 in the first direction (D1). In this embodiment, the alignment protrusion 3223 protrudes away from the electromagnetic unit 2. The first protrusion 3224 protrudes from the pushing block body 3221 in the second direction (D2), and is located in the second space 132. In this embodiment, the first protrusion 3224 protrudes upwardly from the pushing block body 3221. The second protrusion 3225 is located between the first protrusion 3224 and the engaging hole 3222 and between the first protrusion 3224 and the magnetic attraction member 321, and protrudes from the pushing block body 3221 in the second direction (D2). In this embodiment, the second protrusion 3225 protrudes upwardly from the pushing block body 3221. Referring to FIG. 2 again, by virtue of the second protrusion 3225, a creepage distance between the movable conductive terminal 6 and the magnetic attraction member 321 is increased so that the electromagnetic relay may have a higher voltage limit. In addition, when the electromagnetic relay is in use, an input circuit (not shown) that is connected to the electromagnetic unit 2 is insulated from output circuits (not shown) that are respectively connected to the first, second, movable conductive terminals 4, 5, 6. Thus, the electromagnetic relay may be applied in a product that has output circuits with high electrical currents and voltages.

The resilient member 33 has a positioning end 331 and an abutting end 332 opposite to the positioning end 331. The positioning end 331 is positioned at one of the side walls 112. The abutting end 332 extends through the through hole 3213 of the magnetic attraction member 321 into a gap between the magnetic attraction portion 3211 of the magnetic attraction member 321 and the body portion 312 of the magnetic member 31, and resiliently abuts against the magnetic attraction portion 3211 of the magnetic attraction member 321.

Figure 2:
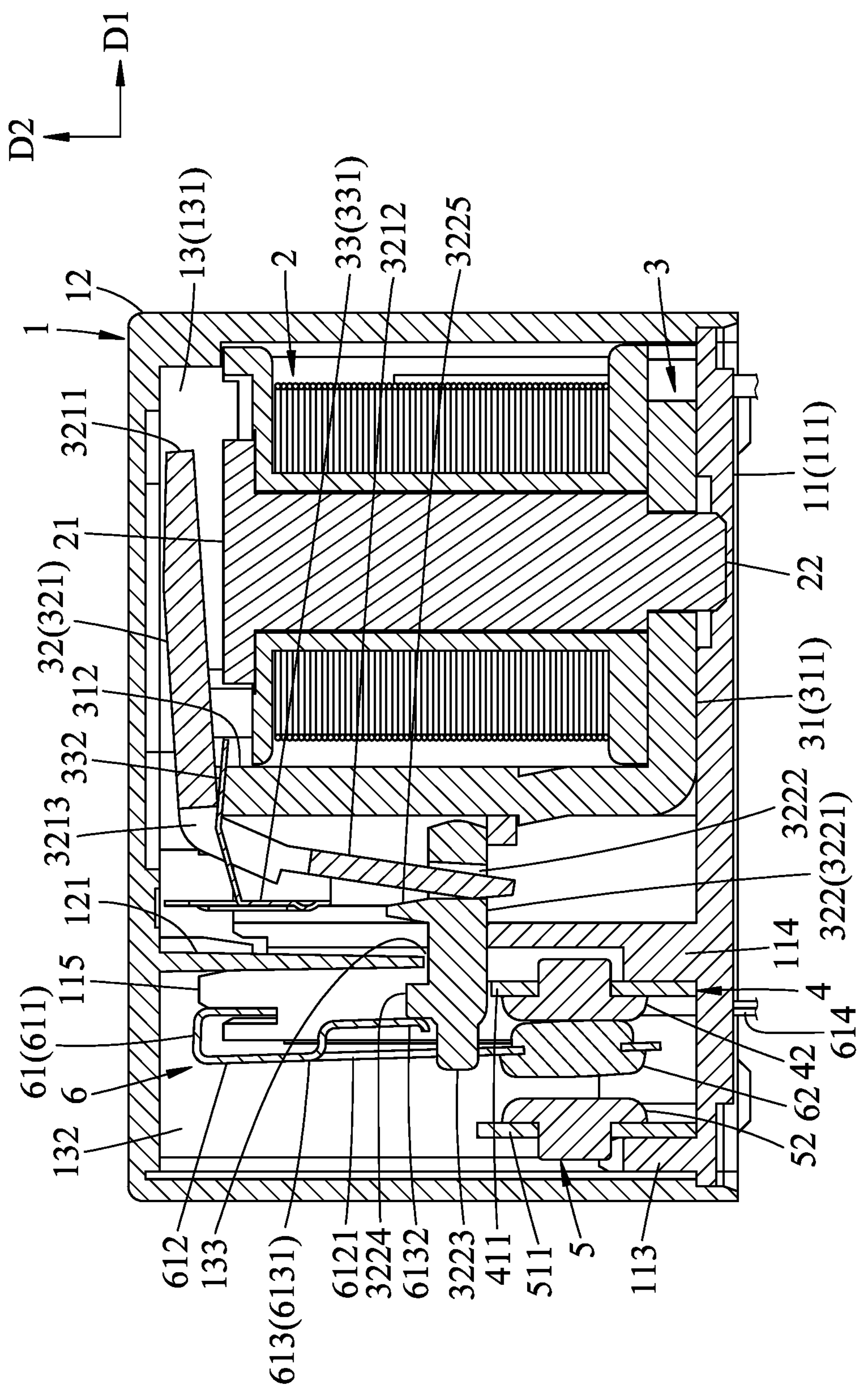
FIG. 2 is a fragmentary sectional view illustrating a movable contact of a movable conductive terminal of the embodiment being in contact with a first contact of a first conductive terminal of the embodiment.
Figure 3:
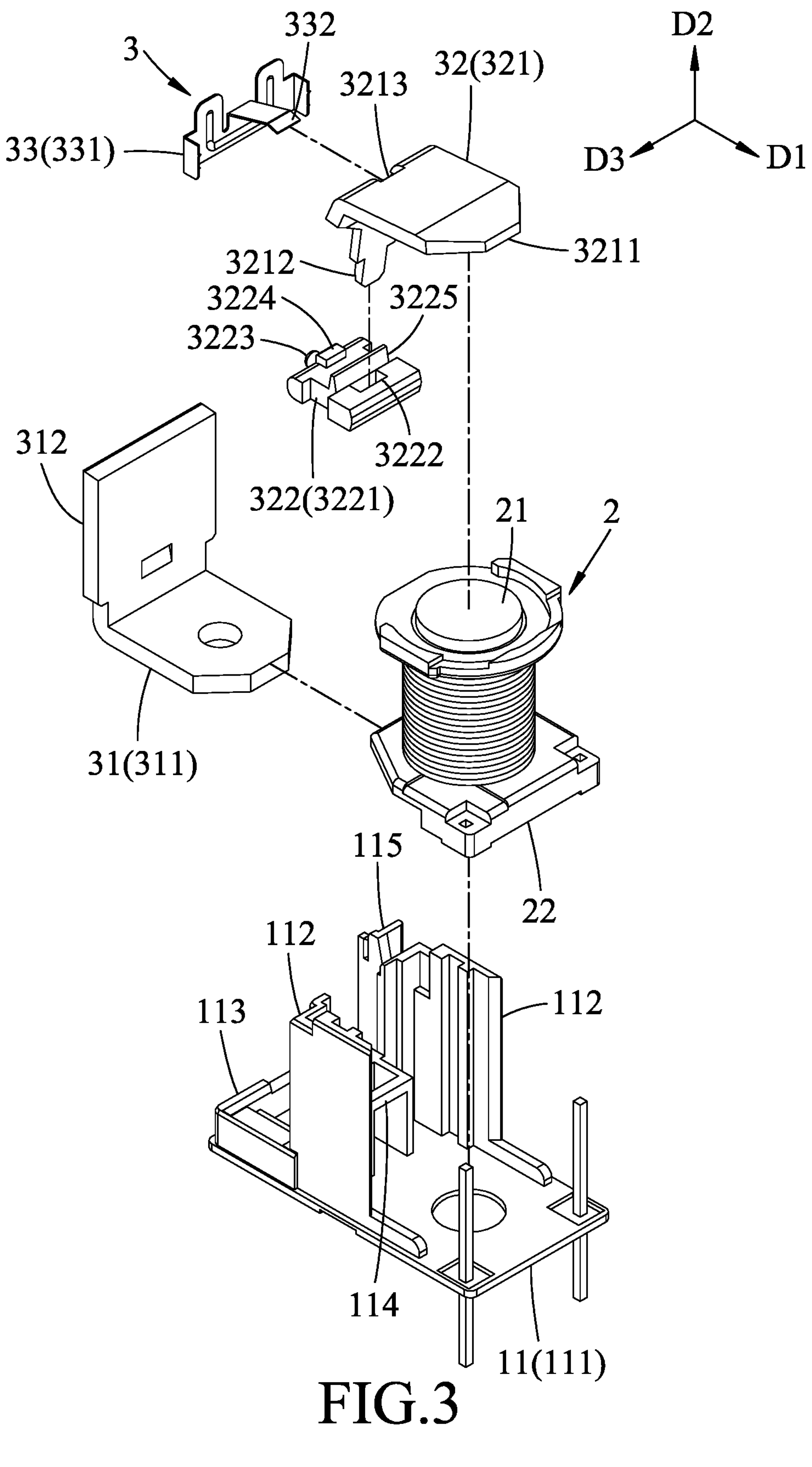
FIG. 3 is an exploded perspective view illustrating an assembly of a base seat of a base unit of the embodiment, an electromagnetic unit of the embodiment, and a magnetic attraction unit of the embodiment.
Figure 4:
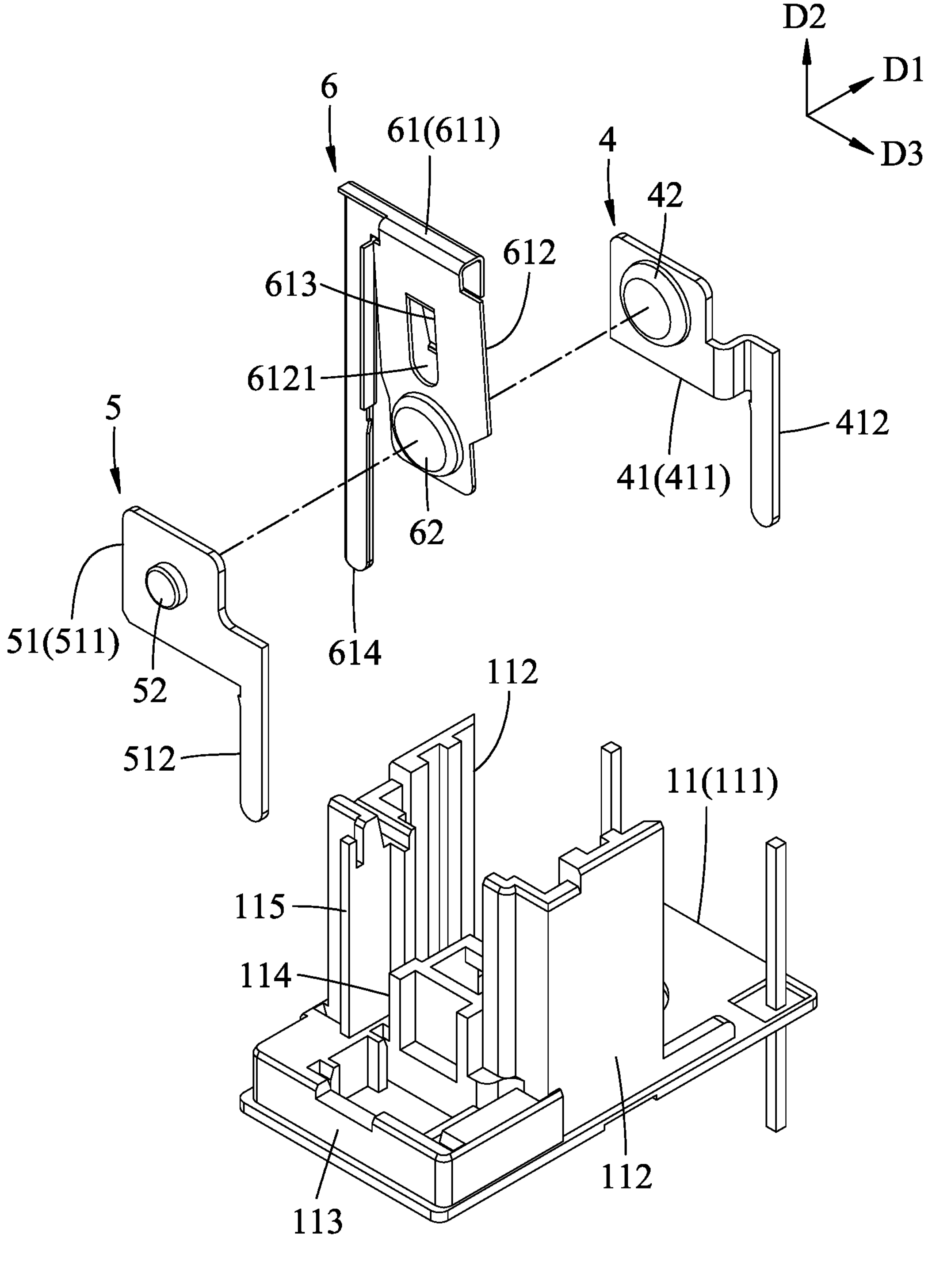
FIG. 4 is an exploded perspective view illustrating an assembly of the base seat, the first conductive terminal, a second conductive terminal of the embodiment, and the movable conductive terminal.
Figure 5:
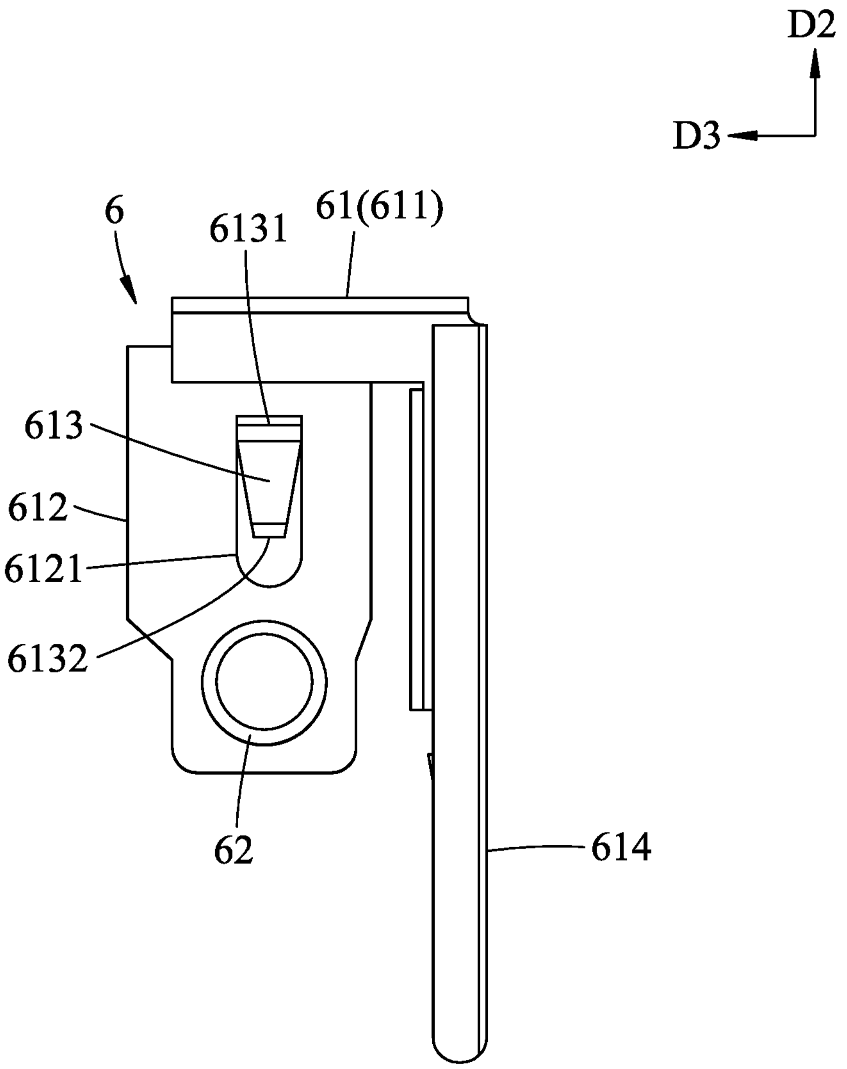
FIG. 5 is a side view of the movable conductive terminal.

Referring to further to FIG. 5, in cooperation with FIGS. 2 and 4, the first and second conductive terminals 4, 5 are disposed on the lead seat body 113 of the base unit 1, are spaced apart from each other in the first direction (D1), and cooperatively define a gap therebetween. The first conductive terminal 4 is closer to the electromagnetic unit 2 than the second conductive terminal 5, and includes a first lead 41 and a first contact 42. The first lead 41 is configured as a one-piece formed metal plate, and has a first body portion 411 that is located in the second space 132 and that is adjacent to the block seat body 114, and a first lead portion 412 that extends downwardly from the first body portion 411 and that extends through the base wall 111 (see FIG. 1). The first contact 42 is fixedly mounted to the first body portion 411. The first conductive terminal 4 is electrically coupled to the respective one of the output circuits via the first lead portion 412 thereof.

The second conductive terminal 5 includes a second lead 51 and a second contact 52. The second lead 51 is configured as a one-piece formed metal plate, and has a second body portion 511 that is located in the second space 132 and that is spaced apart from the first body portion 411 in the first direction (D1), and a second lead portion 512 that extends downwardly from the second body portion 511 and that extends through the base wall 111 (see FIG. 1). The second contact 52 is fixedly mounted to the second body portion 511, and is spaced apart from the first contact 42 in the first direction (D1). The second conductive terminal 5 is electrically coupled to the respective one of the output circuits via the second lead portion 512 thereof.

The movable conductive terminal 6 is disposed on the base unit 1, is located in the second space 132 defined by the base unit 1, and includes a movable lead 61 and a movable contact 62.

The movable lead 61 is configured as a one-piece formed metal plate, is disposed on the base seat 11, and is located in the second space 132. The engaging portion 3212 of the magnetic attraction member 321 is adjacent to the movable lead 61. The movable lead 61 has a positioning portion 611, a swing portion 612, a resilient linkage portion 613, and a movable lead portion 614. The positioning portion 611 is hooked to a top end of the positioning wall 115 of the base unit 1 so that the positioning portion 611 is positioned at the base unit 1. The swing portion 612 extends in the second direction (D2) from the positioning portion 611 to the gap between the first and second conductive terminals 4, 5. The movable contact 62 is disposed on the swing portion 612, and is urged to be in contact with the first contact 42 by the swing portion 612 when the swing portion 612 is free from an external force. The swing portion 612 has an opening 6121 that extends therethrough in the first direction (D1). The alignment protrusion 3223 of the pushing block 322 extends into the opening 6121, thereby assembling the pushing block 322 and the movable lead 61. The resilient linkage portion 613 is located between the positioning portion 611 and the movable contact 62, and corresponds in position to the opening 6121. The resilient linkage portion 613 extends from the swing portion 612 toward the electromagnetic unit 2 in the first direction (D1) and then toward the movable contact 62 in the second direction (D2). The pushing block 322 of the magnetic moving subunit 32 is operable to push the resilient linkage portion 613 of the movable lead 61 such that the movable lead 61 is resiliently bent.

The resilient linkage portion 613 has a connecting end 6131 that is adjacent to the positioning portion 611 and that is connected to the swing portion 612, and a free end 6132 that is opposite to the connecting end 6131 and that bends toward the swing portion 612. When the electromagnetic unit 2 is energized, the first protrusion 3224 of the pushing block 322 of the magnetic moving subunit 32 pushes the free end 6132 of the resilient linkage portion 613 of the movable lead 61. A width of the resilient linkage portion 613 in the third direction (D3) decreases in a direction from the positioning portion 611 toward the movable contact 62 (i.e., a width of the connecting end 6131 in the third direction (D3) is larger than that of the free end 6132).

In this embodiment, the swing portion 612 and the resilient linkage portion 613 of the movable lead 61 are integrally formed as one piece. During a process for forming the swing portion 612 and the resilient linkage portion 613, in the beginning, a portion of a metal plate that is predetermined to form the opening 6121 is cut through in the first direction (D1) so that the metal plate has a U-shaped hole. The U-shaped hole defines a specific portion of the metal plate that is partially surrounded by the U-shaped hole and that is predetermined to form the resilient linkage portion 613, and the remaining portion of the metal plate serves as the swing portion 612. Then, two opposite parts of the specific portion of the metal plate in the third direction (D3) are cut off so that a width of the specific portion in the third direction (D3) decreases downwardly. Afterwards, the specific portion of the metal plate is bent toward the electromagnetic unit 2 in the first direction (D1), downwardly toward the movable contact 62, and toward the swing portion 612 (i.e., away from the electromagnetic unit 2), sequentially. Consequently, the specific portion of the metal plate serves as the resilient linkage portion 613.

The movable lead portion 614 is spaced apart from the swing portion 612 in the third direction (D3), extends downwardly from the positioning portion 611, and extends through the base wall 111 (see FIG. 2). The movable conductive terminal 6 is electrically coupled to the respective one of the output circuits via the movable lead portion 614 thereof.

Figure 6:
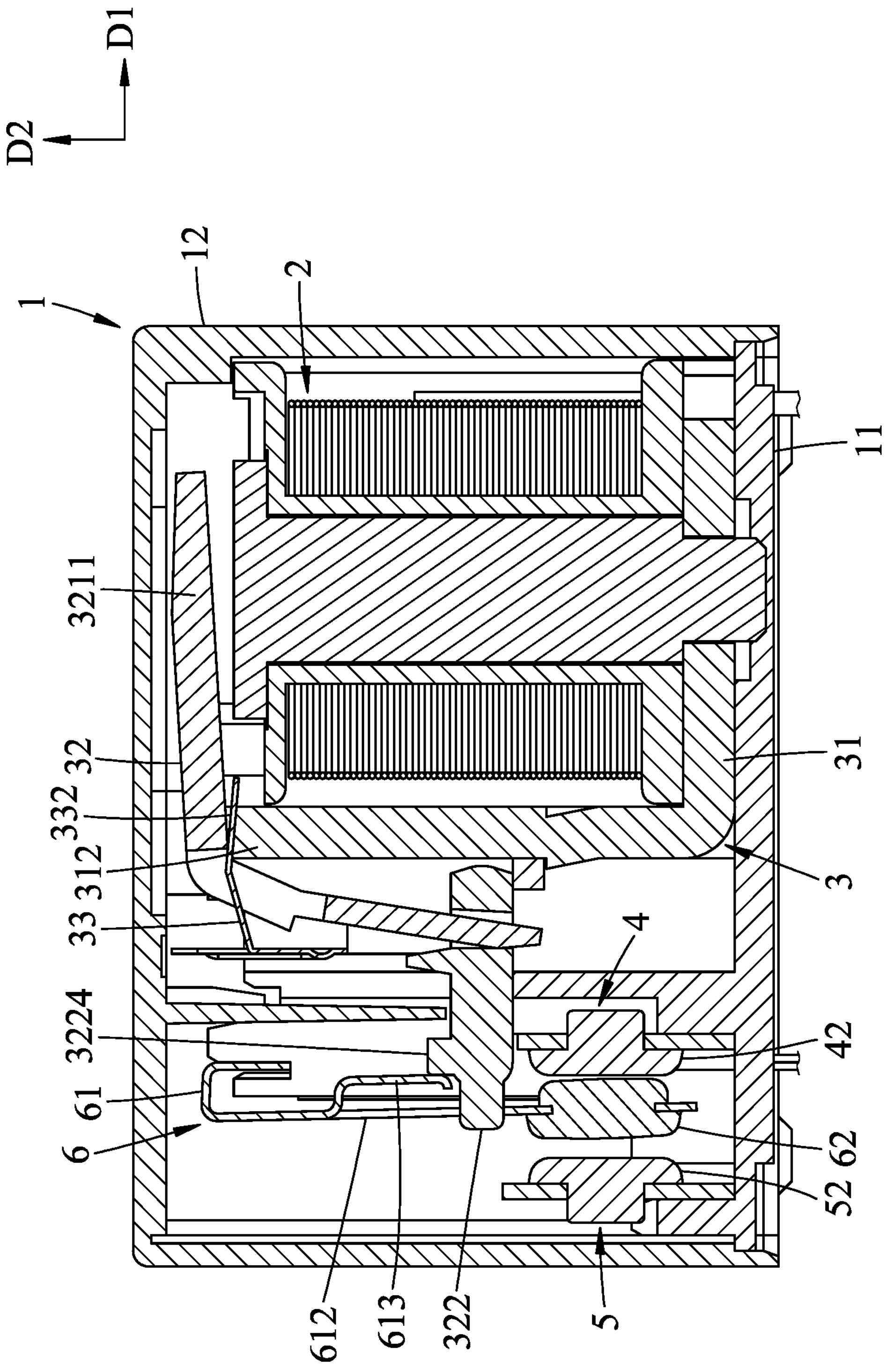
FIGS. 6 to 8 are schematic views illustrating a magnetic moving subunit of the magnetic attraction unit pushing the movable conductive terminal from the first conductive terminal to the second conductive terminal.
Figure 7:
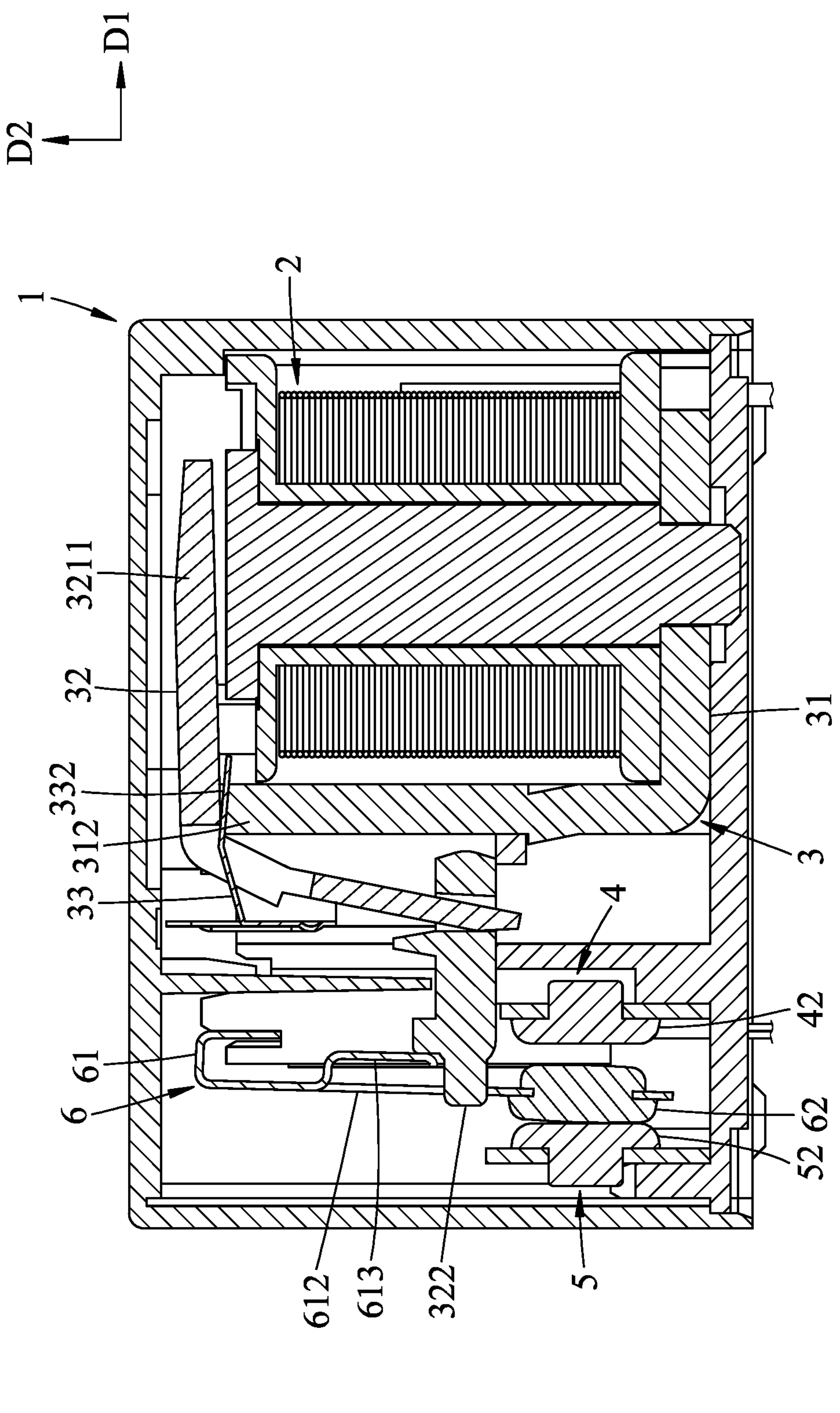
Figure 8:
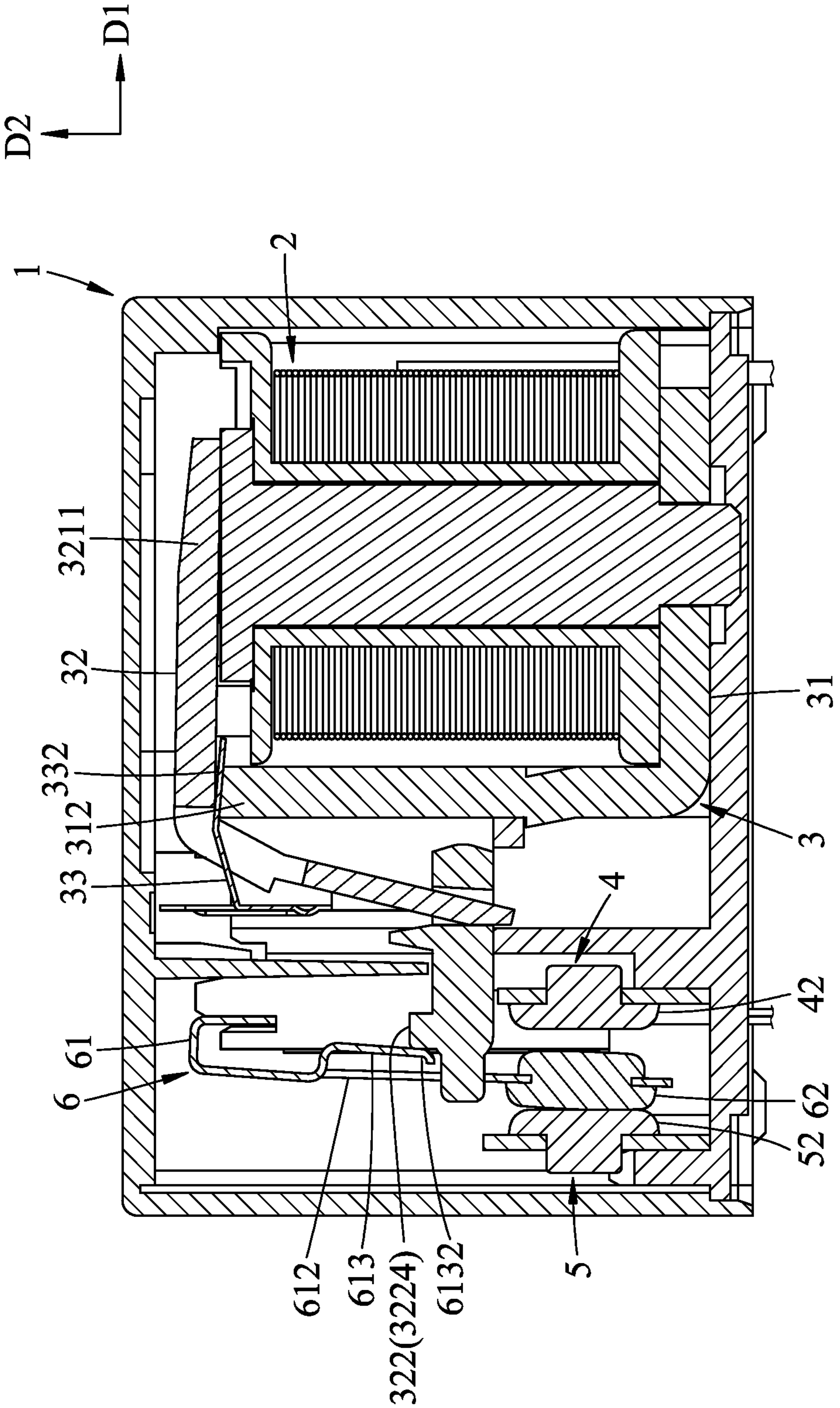

Referring further to FIGS. 6, 7, and 8, in cooperation with FIG. 2, when the electromagnetic unit 2 is energized, the magnetic attraction portion 3211 of the magnetic moving subunit 32 is attracted by the electromagnetic unit 2 such that the magnetic attraction member 321 rotates about a top end of the body portion 312 of the magnetic member 31. At this time, rotation of the magnetic attraction member 321 urges the pushing block 322 to push the resilient linkage portion 613 of the movable lead 61 in the first direction (D1) such that the resilient linkage portion 613 urges the swing portion 612 to swing and that the movable contact 62 disposed on the swing portion 612 is urged to be in contact with the second contact 52 (see FIG. 8). At this time, the swing portion 612 is resiliently bent and stores potential energy, and the abutting end 332 of the resilient member 33 is pushed by the magnetic attraction portion 3211 such that the abutting end 332 is resiliently bent and stores potential energy. Referring to FIG. 2 again, when the electromagnetic unit 2 is de-energized, the first end 21 of the electromagnetic unit 2 ceases to attract the magnetic attraction portion 3211 of the magnetic moving subunit 32. At this time, the resilient member 33 releases the potential energy stored in the abutting end 332 thereof and the swing portion 612 releases the potential energy stored therein such that the resilient member 33 and the swing portion 612 urge the magnetic moving subunit 32 to move toward its initial position. When the swing portion 612 releases the potential energy stored therein, the swing portion 612 moves toward its initial position such that the movable contact 62 is in contact with the first contact 42. Therefore, the electromagnetic relay may switch power between the output circuits that are respectively connected to the first and second leads 41, 51 when the movable contact 62 moves between the first and second contacts 42, 52.

Referring to FIGS. 9 to 12, in another embodiment of the electromagnetic relay, the movable lead 61' does not have the resilient linkage portion 613, and the pushing block 322' does not have the first protrusion 3224. Thus, in the another embodiment, when the electromagnetic unit 2 is energized, the pushing block 322' pushes the swing portion 612 of the movable lead 61' via the pushing block body 3221 thereof.

Figure 13:
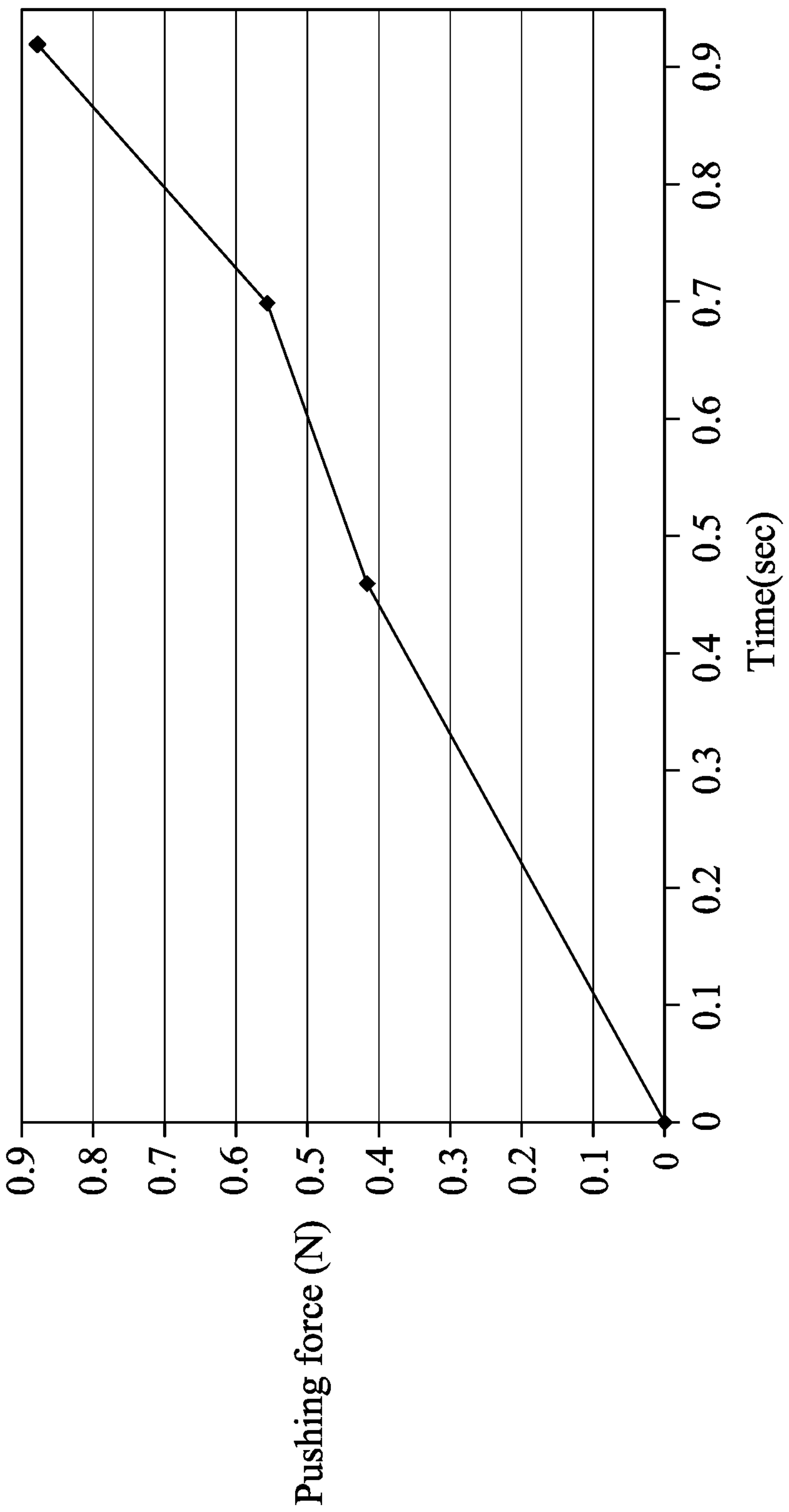
FIG. 13 is a line graph illustrating changes in a pushing force that the magnetic moving subunit of the embodiment applies on the movable conductive terminal of the embodiment over time.
Figure 14:
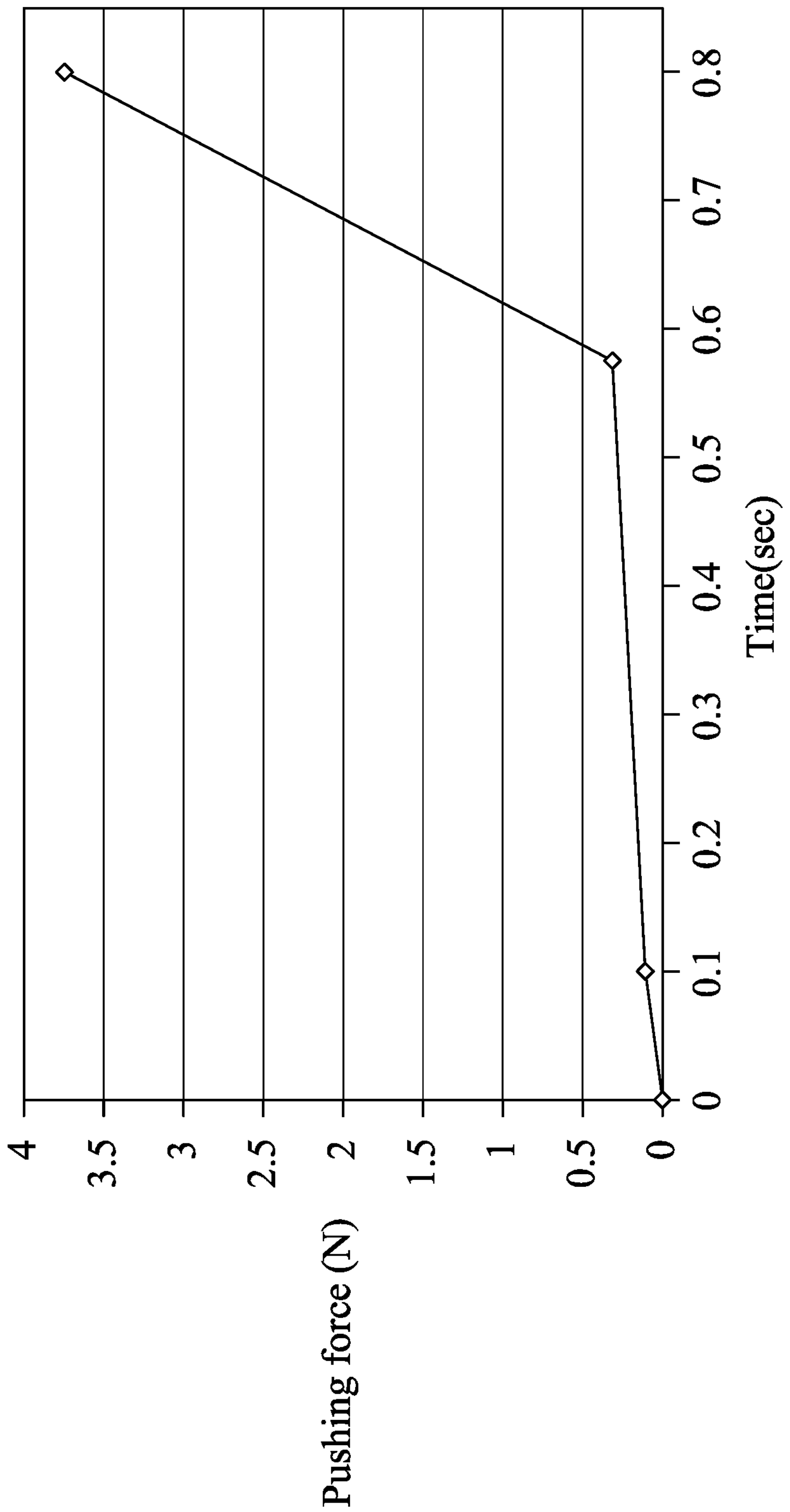
FIG. 14 is a line graph, illustrating changes in a pushing force that the magnetic moving subunit of the another embodiment applies on the movable conductive terminal of the another embodiment over time.

Referring to FIGS. 13 and 14, in cooperation with Table 1 below, pushing forces that the pushing block 322 applies on the movable lead 61 at different times, and pushing forces that the pushing block 322' applies on the movable lead 61' at different times are shown. The unit that is used to measure the pushing forces is in Newtons (N). It is noted that the data in FIGS. 13 and 14 and Table 1 are derived from simulations generated by Ansys Workbench software.

TABLE 1

| Embodiment | | | Another embodiment | | |
|---|---|---|---|---|---|
| Measurement Point | Time (sec.) | Pushing Force (N) | Measurement Point | Time (sec.) | Pushing Force (N) |
| 1 | 0 | 0 | A | 0 | 0 |
| 2 | 0.46 | 0.41722 | B | 0.1 | 0.10805 |
| 3 | 0.7 | 0.55797 | C | 0.575 | 0.31014 |
| 4 | 0.92 | 0.87988 | D | 0.8 | 3.7485 |

In the embodiment, the measurement point 1 is represented by FIG. 2, in which the movable contact 62 is in contact with the first contact 42. The measurement point 2 is represented by FIG. 6, in which the movable contact 62 has just been separated from the first contact 42. The measurement point 3 is represented by FIG. 7, in which the movable contact 62 is just in contact with the second contact 52. The measurement point 4 is represented by FIG. 8, in which the first protrusion 3224 of the pushing block 322 keeps pushing the free end 6132 of the movable lead 61 such that the free end 6132 approaches the swing portion 612 in the first direction (D1) and that the movable contact 62 closely abuts against the second contact 52.

Figure 9:
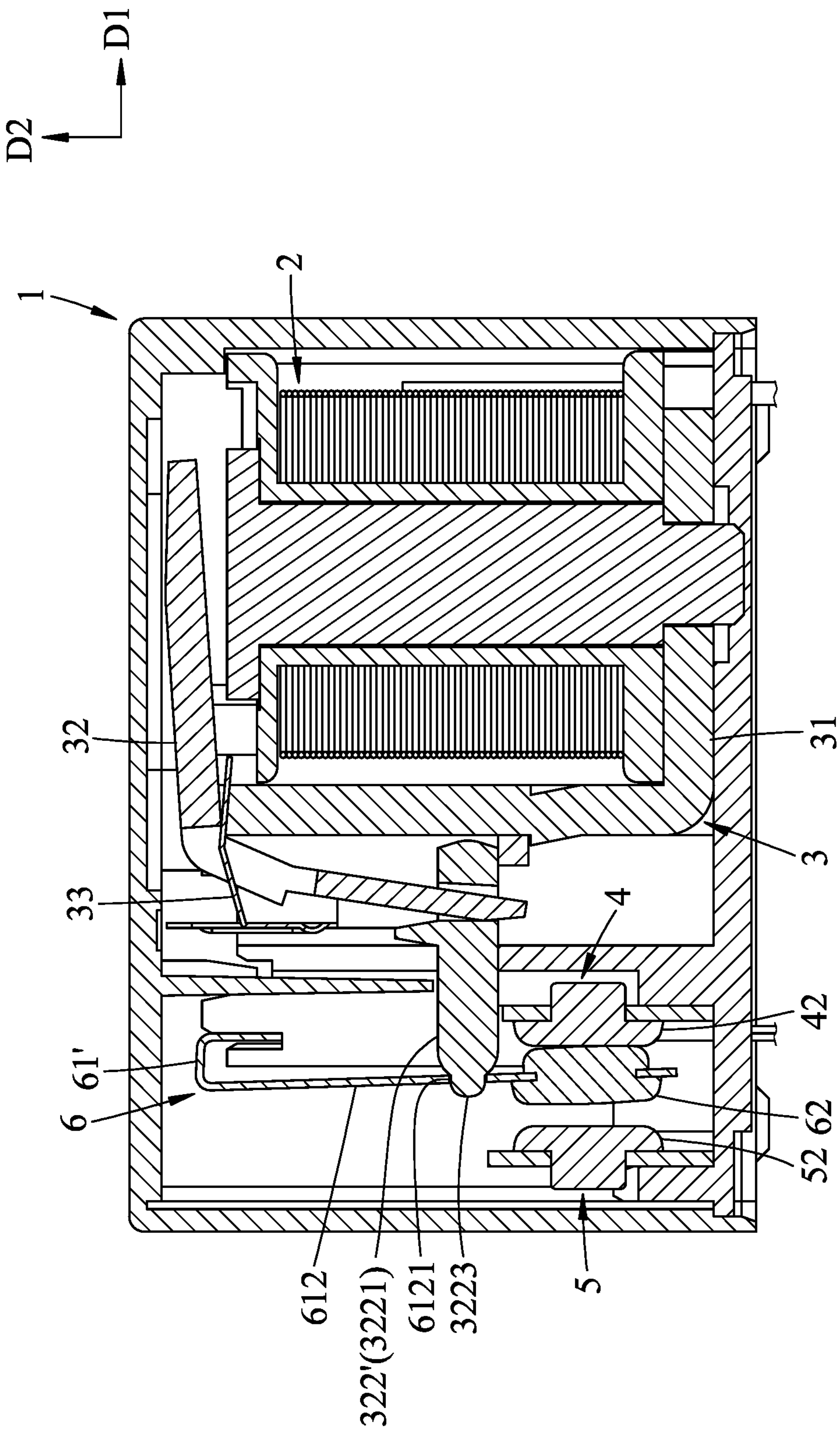
FIGS. 9 to 12 are schematic views illustrating that in another embodiment of the electromagnetic relay, a magnetic moving subunit pushes a movable conductive terminal from a first conductive terminal to a second conductive terminal.
Figure 10:
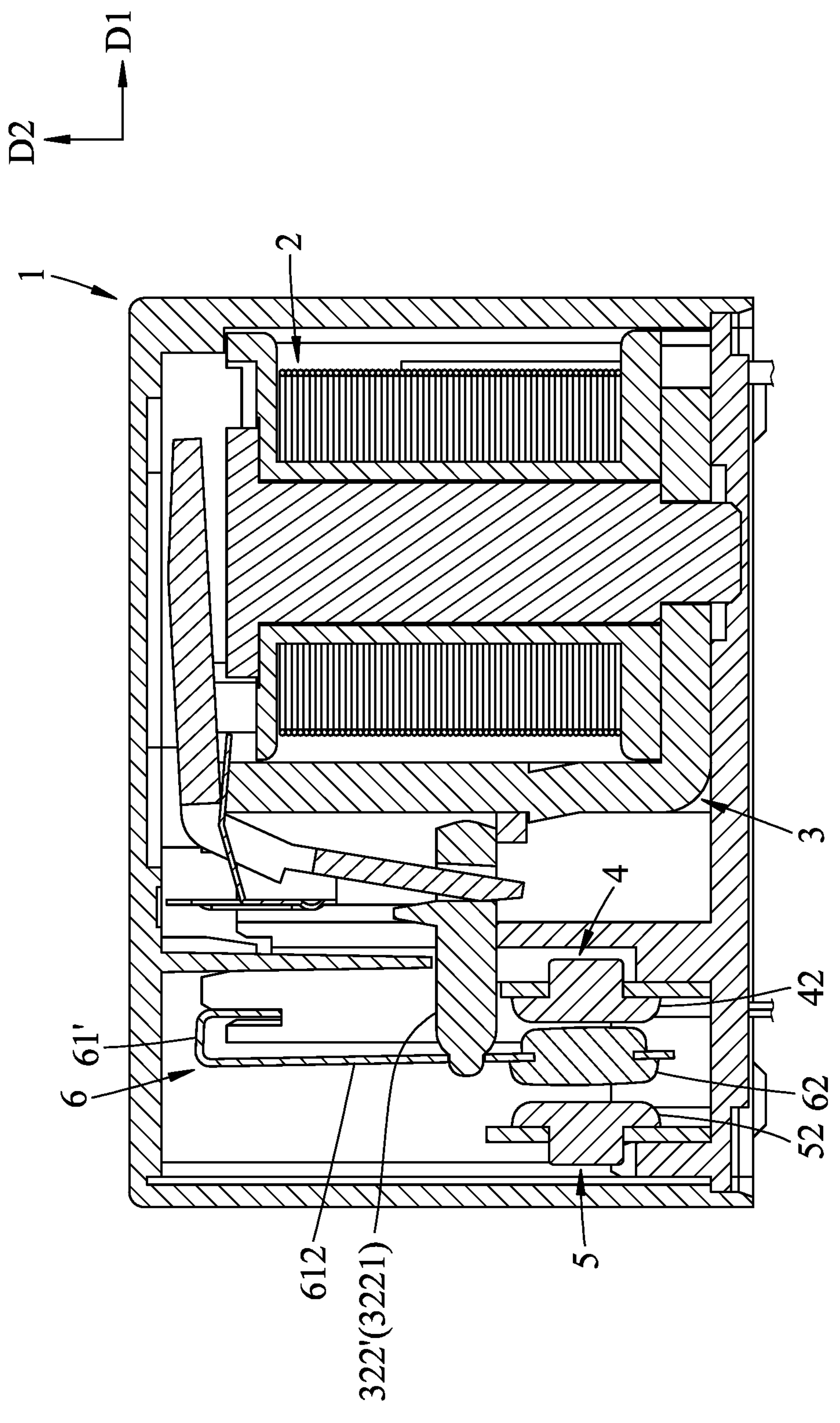
Figure 11:
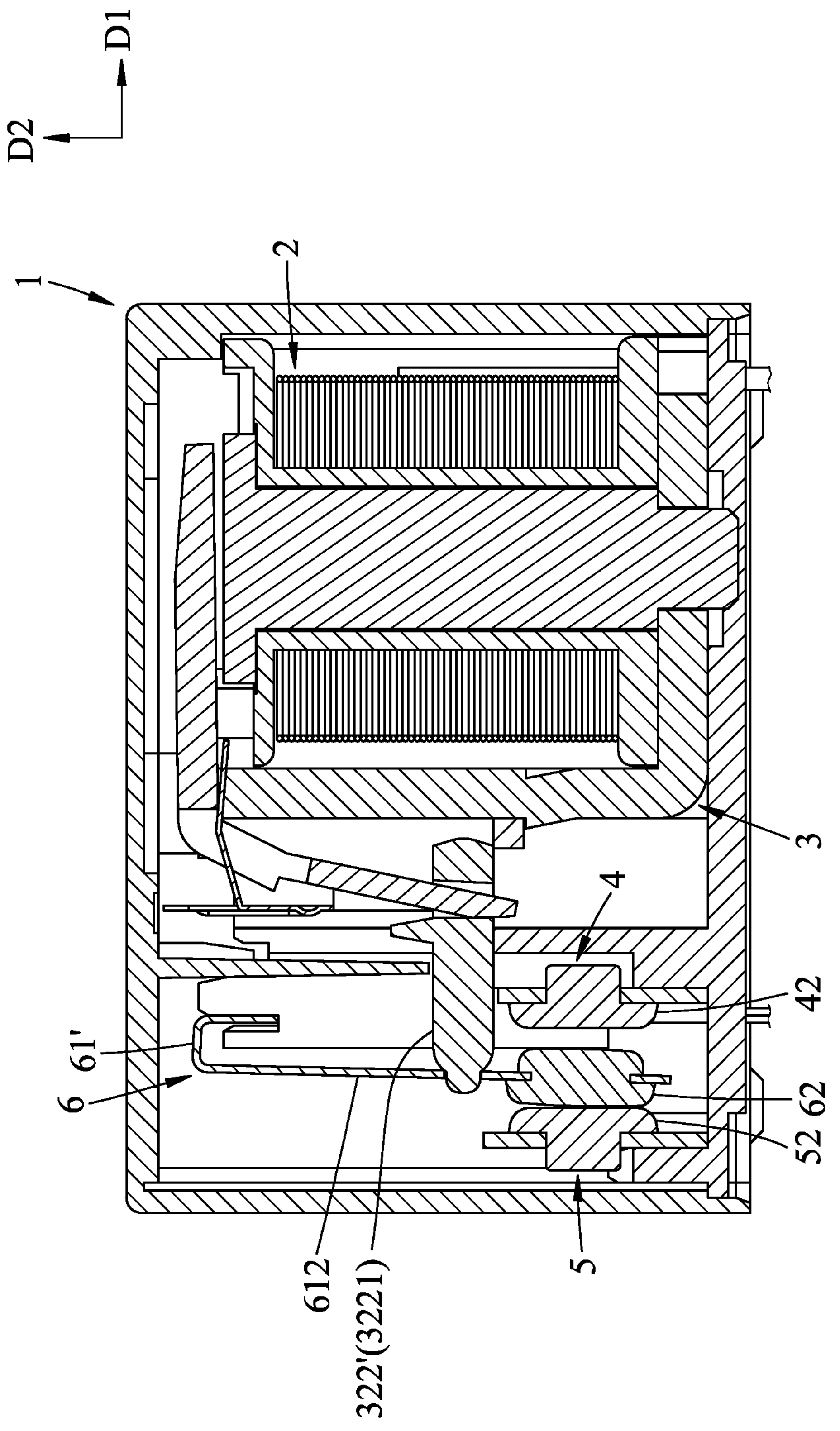
Figure 12:
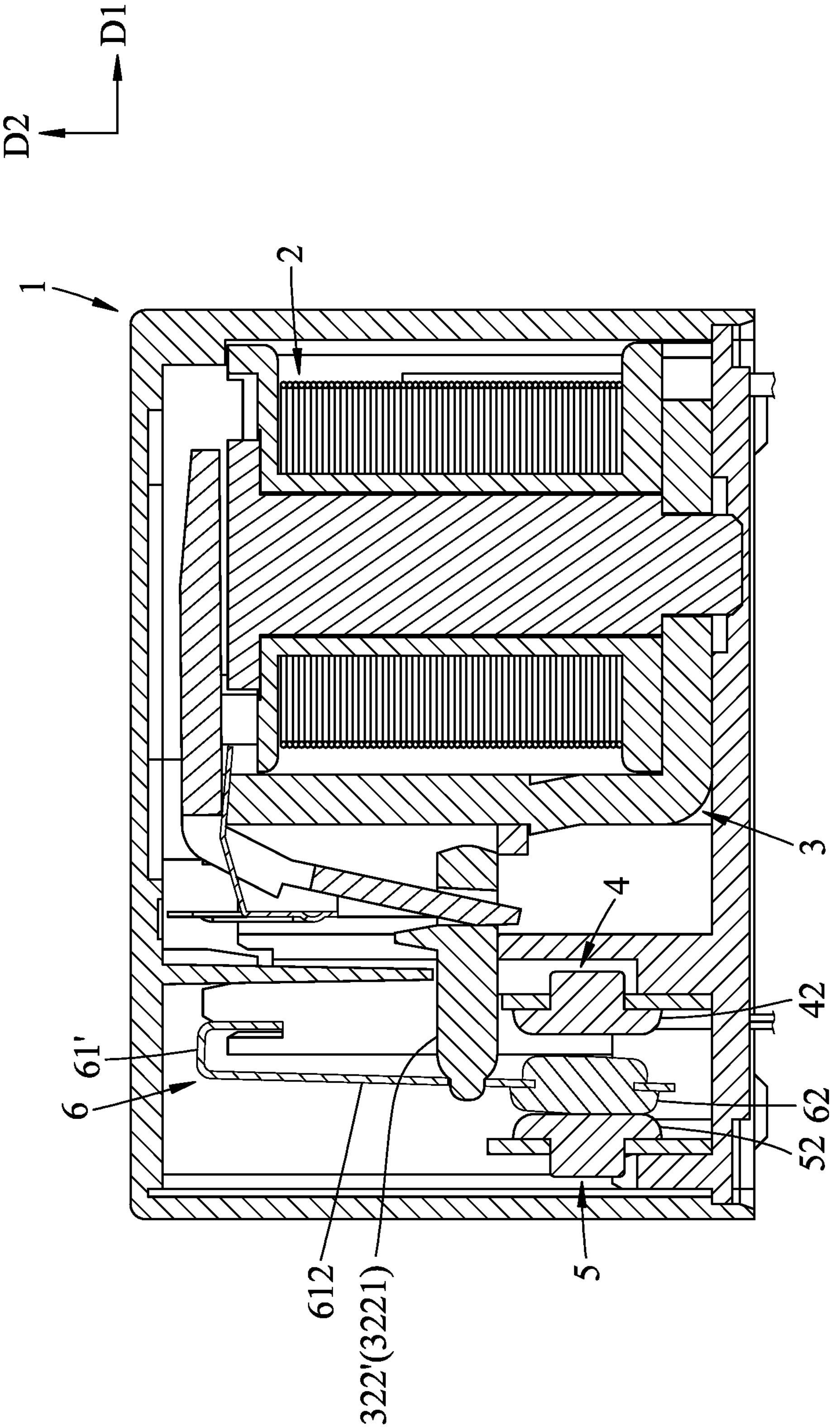

In the another embodiment, the measurement point A is represented by FIG. 9, in which the movable contact 62 is in contact with the first contact 42. The measurement point B is represented by FIG. 10, in which the movable contact 62 has just been separated from the first contact 42. The measurement point C is represented by FIG. 11, in which the movable contact 62 is just in contact with the second contact 52. The measurement point D is represented by FIG. 12, in which the pushing block body 3221 of the pushing block 322' keeps pushing the swing portion 612 of the movable lead 61' such that the movable contact 62 closely abuts against the second contact 52.

FIGS. 13 and 14 clearly show that changes in the pushing force of the embodiment over time are more moderate than changes in the pushing force of the another embodiment over time. By virtue of the resilient linkage portion 613 being connected to the swing portion 612, and by virtue of the pushing block 322 pushing the resilient linkage portion 613 when the electromagnetic unit 2 is energized, the pushing block 322 may not directly apply the pushing force on the swing portion 612 because the pushing force is transmitted from the pushing block 322 to the swing portion 612 through the resilient linkage portion 613, and the swing portion 612 is urged to move by the resilient linkage portion 613. However, in the another embodiment, the pushing block 322' directly applies the pushing force on the swing portion 612 such that the pushing force may not be dispersed over the movable lead 61'. Thus, the pushing force measured at the measurement point 4 is much smaller than the pushing force measured at the measurement point D.

By virtue of the resilient linkage portion 613 urging the swing portion 612 to swing, the swing portion 612 may be urged to swing by a greater extent even when a relatively small pushing force is applied on the movable lead 61. Therefore, when arcing occurs and when the arcing causes a gap to form between the movable contact 62 and the second contact 52 through corrosion, the movable contact 62 may still be operable to be in contact with the second contact 52 via a wider swing range of the swing portion 612. The electromagnetic relay may thus have a greater tolerance towards corrosion caused by arcing, and may thus be prevented from contact failure, which increases the service life of the electromagnetic relay.

Furthermore, because the movable lead 61 may be operated with a relatively small pushing force, the electromagnetic unit 2 may attract the magnetic moving subunit 32 with a smaller electromagnetic force. Thus, the size of the electromagnetic unit 2 may be reduced, thereby reducing the overall size of the electromagnetic relay.

By virtue of the resilient linkage portion 613 being located between the positioning portion 611 and the movable contact 62, and by virtue of the resilient linkage portion 613 extending from the swing portion 612 toward the electromagnetic unit 2 in the first direction (D1) and then toward the movable contact 62 in the second direction (D2), the resilient linkage portion 613 may urge the swing portion 612 to swing when pushed by the magnetic moving subunit 32, and a swing range of the swing portion 612 may be increased. Consequently, even when there is a gap that is formed by corrosion caused by arcing between the movable contact 62 and the second contact 52, the movable contact 62 may still be operable to be in contact with the second contact 52. That is to say, the electromagnetic relay may have a greater tolerance towards corrosion caused by arcing, and may be prevented from contact failure, which increases the service life of the electromagnetic relay. The purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electromagnetic relay comprising:

a base unit;

an electromagnetic unit disposed on said base unit, and capable of generating a magnetic field when energized;

a magnetic attraction unit disposed on said base unit, connected to said electromagnetic unit, and including a magnetic moving subunit, said electromagnetic unit attracting said magnetic moving subunit via the magnetic field when energized;

a first conductive terminal disposed on said base unit and including a first contact;

a second conductive terminal disposed on said base unit and including a second contact that is spaced apart from said first contact in a first direction, said first conductive terminal and said second conductive terminal cooperatively defining a gap therebetween; and a movable conductive terminal disposed on said base unit and including a movable lead and a movable contact, said movable lead having a positioning portion that is positioned at said base unit, a swing portion that extends in a second direction from said positioning portion to said gap between said first conductive terminal and said second conductive terminal, and a resilient linkage portion, said magnetic moving subunit being operable to push said movable lead such that said movable lead is resiliently bent, said movable contact being disposed on said swing portion, said resilient linkage portion being located between said positioning portion and said movable contact, extending from said swing portion toward said electromagnetic unit in the first direction and then toward said movable contact in the second direction, the second direction and the first direction being non-parallel, when said electromagnetic unit is energized, said magnetic moving subunit being attracted by said electromagnetic unit and pushing said resilient linkage portion of said movable lead such that said resilient linkage portion urges said swing portion to swing and that said movable contact disposed on said swing portion is urged to be in contact with one of said first contact and said second contact, when said electromagnetic unit is de-energized, said electromagnetic unit ceasing to attract said magnetic moving subunit such that said movable contact is in contact with the other one of said first contact and said second contact.

2. The electromagnetic relay as claimed in claim 1, wherein a width of said resilient linkage portion of said movable lead in a third direction decreases in a direction from said positioning portion toward said movable contact, the first direction, the second direction, and the third direction being mutually orthogonal.

3. The electromagnetic relay as claimed in claim 1, wherein said resilient linkage portion has a connecting end that is adjacent to said positioning portion and that is connected to said swing portion, and a free end that is opposite to said connecting end and that bends toward said swing portion, when said electromagnetic unit is energized, said magnetic moving subunit pushing said free end of said resilient linkage portion.

4. The electromagnetic relay as claimed in claim 1, wherein said swing portion and said resilient linkage portion of said movable lead are integrally formed.

5. The electromagnetic relay as claimed in claim 1, wherein said magnetic moving subunit includes a magnetic attraction member that is adjacent to said electromagnetic unit, and a pushing block that is connected to said magnetic attraction member and that is operable to push said resilient linkage portion.

6. The electromagnetic relay as claimed in claim 5, wherein said pushing block has an engaging hole, said magnetic attraction member having a magnetic attraction portion and an engaging portion that is opposite to said magnetic attraction portion, that is adjacent to said movable lead, and that engages said engaging hole, said electromagnetic unit attracting said magnetic attraction portion of said magnetic attraction member of said magnetic moving subunit when energized.

7. The electromagnetic relay as claimed in claim 5, wherein said pushing block has a pushing block body that extends in the first direction, and a first protrusion that protrudes from said pushing block body in the second direction, when said electromagnetic unit is energized, said first protrusion of said pushing block of said magnetic moving subunit pushing said resilient linkage portion of said movable lead.

8. The electromagnetic relay as claimed in claim 7, wherein said pushing block further has a second protrusion that is located between said first protrusion and said magnetic attraction member, and that protrudes from said pushing block body in the second direction.

9. The electromagnetic relay as claimed in claim 7, wherein said swing portion of said movable lead has an opening that extends therethrough in the first direction, said pushing block further having an alignment protrusion that protrudes from said pushing block body in the first direction, and that extends into said opening.

* * * * *